US007375569B2

(12) United States Patent
Hall et al.

(10) Patent No.: US 7,375,569 B2
(45) Date of Patent: May 20, 2008

(54) LAST STAGE SYNCHRONIZER SYSTEM

(75) Inventors: Timothy A. Hall, St. Joseph, MI (US); Ted J. Casper, West Bend, WI (US)

(73) Assignee: Leco Corporation, St. Joseph, MI (US)

(*) Notice: Subject to any disclaimer, the term of this patent is extended or adjusted under 35 U.S.C. 154(b) by 0 days.

(21) Appl. No.: 11/520,939

(22) Filed: Sep. 14, 2006

(65) Prior Publication Data

US 2007/0063139 A1 Mar. 22, 2007

Related U.S. Application Data

(60) Provisional application No. 60/719,128, filed on Sep. 21, 2005.

(51) Int. Cl.
*G05B 13/04* (2006.01)

(52) U.S. Cl. ....................... 327/277; 250/287; 375/226

(58) Field of Classification Search ................ 250/287; 375/226, 333, 371; 327/142, 91, 100
See application file for complete search history.

(56) References Cited

U.S. PATENT DOCUMENTS

| | | | | |
|---|---|---|---|---|
| 3,340,395 | A * | 9/1967 | Webb | 250/286 |
| 3,668,384 | A * | 6/1972 | Moorman et al. | 250/287 |
| 5,418,498 | A | 5/1995 | DeVito et al. | |
| 5,981,946 | A | 11/1999 | Mason | |
| 6,246,276 | B1 * | 6/2001 | Arkas et al. | 327/292 |
| 6,426,984 | B1 * | 7/2002 | Perino et al. | 375/356 |
| 6,518,568 | B1 * | 2/2003 | Kovtoun et al. | 250/287 |
| 6,770,870 | B2 | 8/2004 | Vestal | |
| 6,795,496 | B1 * | 9/2004 | Soma et al. | 375/226 |
| 6,822,227 | B1 * | 11/2004 | Hidalgo et al. | 250/287 |
| 6,828,553 | B2 | 12/2004 | Weiss | |
| 6,861,645 | B2 | 3/2005 | Franzen | |
| 6,870,156 | B2 | 3/2005 | Räther | |
| 7,061,292 | B2 * | 6/2006 | Maksimovic et al. | 327/277 |
| 7,093,177 | B2 * | 8/2006 | West et al. | 714/738 |
| 7,227,920 | B2 * | 6/2007 | Heikkila | 375/371 |
| 2005/0056779 | A1 | 3/2005 | Chefetz et al. | |
| 2007/0139102 | A1 * | 6/2007 | Laletin | 327/552 |

OTHER PUBLICATIONS

MXT3010 High-Performance Cell Processor (6 pages) 1998 ©.
MXT3010 Reference Manual Version 4.1 excerpts (16 pages) including pp. 360-363 Oct. 1999 ©.
International Search Report and Written Opinion for International Application No. PCT/US06/36230 dated Sep. 26, 2007 (14 pages).

* cited by examiner

*Primary Examiner*—Nikita Wells
*Assistant Examiner*—Johnnie L Smith, II
(74) *Attorney, Agent, or Firm*—Price, Heneveld, Cooper, DeWitt & Litton, LLP

(57) ABSTRACT

A pulse jitter reduction circuit employs a low jitter system clock coupled to synchronize a pulse generating device and an ultra low jitter flip-flop to generate substantially jitter-free trigger signals employed to generate high voltage pulses for a flight tube of a time-of-flight mass spectrometer. By eliminating time fluctuations due to jitter in the triggering signal, the predictability of the arrival time of ions along a flight tube of a time-of-flight mass spectrometer is greatly improved, thereby improving the resolution of the mass spectrometer.

23 Claims, 2 Drawing Sheets

LAST STAGE SYNCHRONIZER SYSTEM

CROSS-REFERENCE TO RELATED APPLICATIONS

This application claims priority under 35 U.S.C. § 119(e) on U.S. Provisional Application No. 60/719,128 entitled Last Stage Synchronizer System, filed on Sep. 21, 2005, by Timothy A. Hall, the entire disclosure of which is incorporated herein by reference.

BACKGROUND OF THE INVENTION

The present invention relates to a pulse jitter reduction circuit which is employed as a last stage synchronizer for synchronizing a pulser circuit for a time-of-flight (TOF) mass spectrometer with the data acquisition circuits to improve the signal resolution of the spectrometer.

A TOF mass spectrometer relies upon precise timing between the high voltage acceleration pulse applied to the flight tube to accelerate ions along the flight tube and the subsequent detection of the time of arrival of the ions by the data acquisition system. The high voltage pulse employed for accelerating the ions, therefore, must be synchronized with the data acquisition timing, such that ions corresponding to particular elements can be accurately identified. The more precise the timing relationship of the respective signals, the more precise and higher the resolution of the mass spectrometer. With conventional pulse-trigger systems employed to provide the high voltage pulses to the flight tube, inherent uncertainty exists in the pulse initiation. This inherent fluctuation in the pulse initiation time is referred to as "jitter" and is a limiting factor of the resolution of a TOF mass spectrometer. Jitter as high as 100 pico seconds (ps) or higher is common and adversely affects the resolution of a mass spectrometer, particularly where samples having closely grouped elemental ions are involved.

Thus, there exists a need for an improved triggering circuit which eliminates or greatly reduces jitter existing in conventional triggering circuits.

SUMMARY OF THE INVENTION

A pulse jitter reduction circuit employs a low jitter system clock coupled to a pulse generator and an ultra low jitter flip-flop to generate substantially jitter-free trigger signals employed to generate high voltage pulses for the flight tube of a TOF mass spectrometer. By eliminating time fluctuations due to jitter in the triggering signal, the predictability of the arrival time of ions at the detector in a flight tube of a TOF mass spectrometer is greatly improved, thereby improving the resolution of the mass spectrometer.

These and other features, objects and advantages of the present invention will become apparent upon reading the following description thereof together with reference to the accompanying drawings.

DETAILED DESCRIPTION OF THE PREFERRED EMBODIMENT

Figure 1:
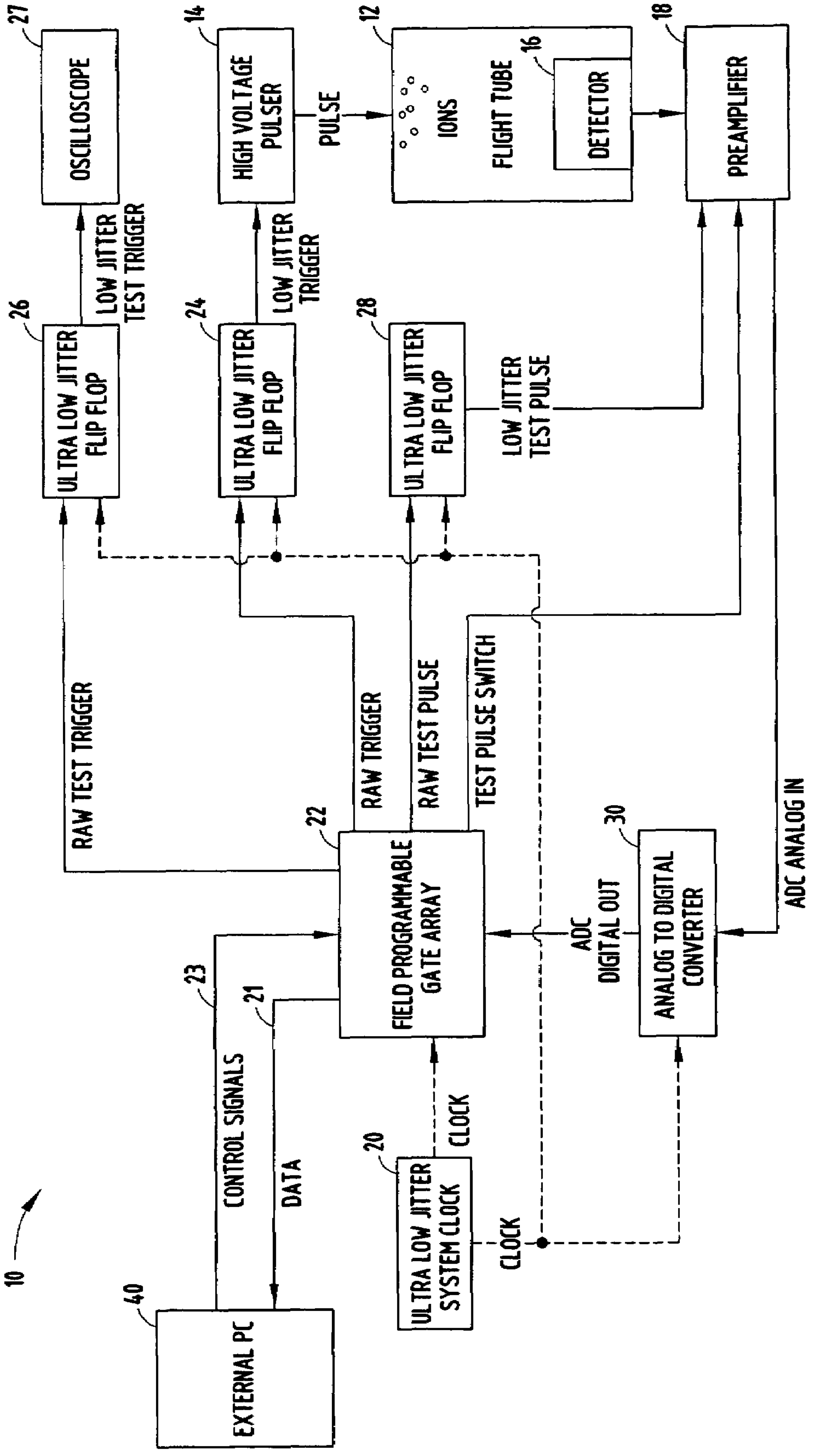
FIG. 1 is an electrical circuit in block form of a TOF mass spectrometer incorporating a low jitter pulse generator of the invention.

Referring to FIG. 1, a TOF mass spectrometer 10 incorporates the circuitry of the present invention and includes a flight tube 12 (shown schematically in FIG. 1) in which ions are grouped in an ionization chamber at one end. The ion chamber generates and holds ions for subsequent acceleration by applied high voltage pulses from high voltage pulser circuit 14. The ions are accelerated down the flight tube to a detector 16 within the flight tube. The details of one TOF mass spectrometer which could benefit from the circuitry of the present invention is disclosed in U.S. Pat. No. 5,981,946 entitled Time-of-Flight Mass Spectrometer Data Acquisition System, the disclosure of which is incorporated herein by reference. As used herein, the expression "ultra low jitter" means the initiation of a pulse with a certainty of less than about 6 pico seconds (6 ps). When used in connection with a circuit definition, it means a circuit capable of such a performance level.

Figure 2:
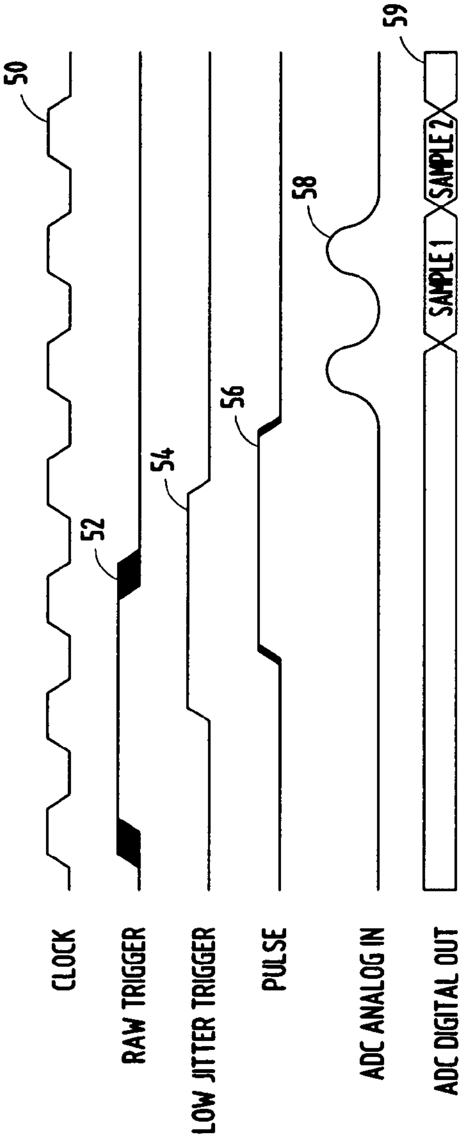
FIG. 2 is a waveform diagram of electrical signals in the circuit of FIG. 1.

The circuit for generating an ultra low jitter trigger pulse includes an ultra low jitter clock 20 coupled to a pulse generator 22 which can be of conventional design and incorporated into a field programmable gate array (FPGA) to provide raw trigger pulses 52 (shown in FIG. 2). The raw trigger pulses 52 from generator 22 are shown in FIG. 2 with the shaded area representing the uncertainty in the initialization and termination of the pulses. This represents "jitter" which can be 100 pico seconds (ps) or more in the typical 4 nano second (ns) pulses 52. The raw trigger pulses 52 are frequency controlled by the clock pulses 50 and are applied to ultra low jitter flip-flop circuits 24, 26, and 28. The resultant low jitter trigger pulse 54 from circuit 24 is applied to the high voltage pulser 14 of the TOF mass spectrometer 10.

As illustrated by pulses 54 in FIG. 2, the jitter present in the raw trigger pulses 52 has been substantially eliminated. The high voltage pulses 56 generated by circuit 14 in response to pulses 54 exhibit a slight but very reduced amount of jitter as represented by the shaded areas on the leading and trailing edge of the pulses. This jitter is estimated to be in the neighborhood of about 5.4 ps representing about a 95% reduction in the jitter existent in the raw trigger signal.

The pulser circuit 14 applies high voltage pulses 56 to the ion chamber to accelerate ions down the flight tube 12 to the detector 16. The output of detector 16 is an analog signal 58 which is applied to a switched preamplifier 18 having an output coupled to the input of an analog-to-digital (A/D) converter 30. The signals 59 from the A/D converter 30 are synchronized with the high voltage pulses from pulser 14 by the ultra low jitter clock signals 50 from clock 20.

Pulses identical to the raw trigger pulses 52 shown in FIG. 2 are applied to two additional ultra low jitter flip-flops 26 and 28, which are employed for providing a test signal to the system for detecting the accuracy of the application of the low jitter pulses 54, which is outputted separately from circuits 24, 26, and 28. One of the test trigger pulses 54 is applied to a measuring instrument, such as an oscilloscope 27, while another test pulse 54 from circuit 28 is applied to the switched preamplifier, which can be switched from looking at the signal from detector 16 and coupling them to the A/D circuit 30 or to transmit signals from circuit 28 to circuit 30 for calibrating the system.

The pulse generator, including the FPGA 22, is coupled to an external PC 40, which is conventionally programmed to receive data from the A/D converter 30 and FPGA 22 representing the ions detected by detector 16. In addition, however, the FPGA controls the preamplifier 18 to look at either the signals from detector 16 or from the test pulse output from circuit 28. By employing a test signal, the data acquisition system can be calibrated to great precision to assure the detected ions are accurately identified with their elements. The signals from the circuit shown in FIG. 1 are shown in FIG. 2, with the clock pulses 50 having a frequency of from about 250 MHz to about 1.5 GHz in a typical TOF embodiment. In a preferred embodiment, the pulse frequency employed was 375 MHz. The trigger pulses 52 have a delay from the clocked pulses of about 500 ps due to the generation delay in the pulse-generating circuit 22.

The subsequent low jitter trigger 54 from the ultra low jitter flip-flops 24, 26, and 28 are substantially jitter-free, as shown in FIG. 2. The high voltage pulse 56 from high voltage pulser 14 is delayed approximately 1000 ps due to the inherent delay in a high voltage pulser circuit.

The data output signal from preamplifier 18 is shown by analog waveform diagrams 58 in FIG. 2 in which amplitude of the signal indicates the quantity of ions of a particular element have been detected. Finally, the output from A/D converter 30 is schematically illustrated by waveform 59 in FIG. 2 and comprises a digital number representing the number of and the timing of arrival of ions at detector 16 for two sampled ions (as an example). These signals are applied to the FPGA 22, which outputs them as data to the input of the PC 40, as shown by connection 21.

The PC 40 is programmed as in prior Leco Corporation TOF mass spectrometers, such as Leco Model No. Pegasus® IV, to receive the data and provide an output to a printer and/or monitor for analytical samples under test. The PC 40 also applies control signals via conductor 23 to the FPGA 22 for initiating the test pulses and calibrating the instrument. The details of one embodiment of the ultra low jitter pulse generator is shown in FIG. 3.

Figure 3:
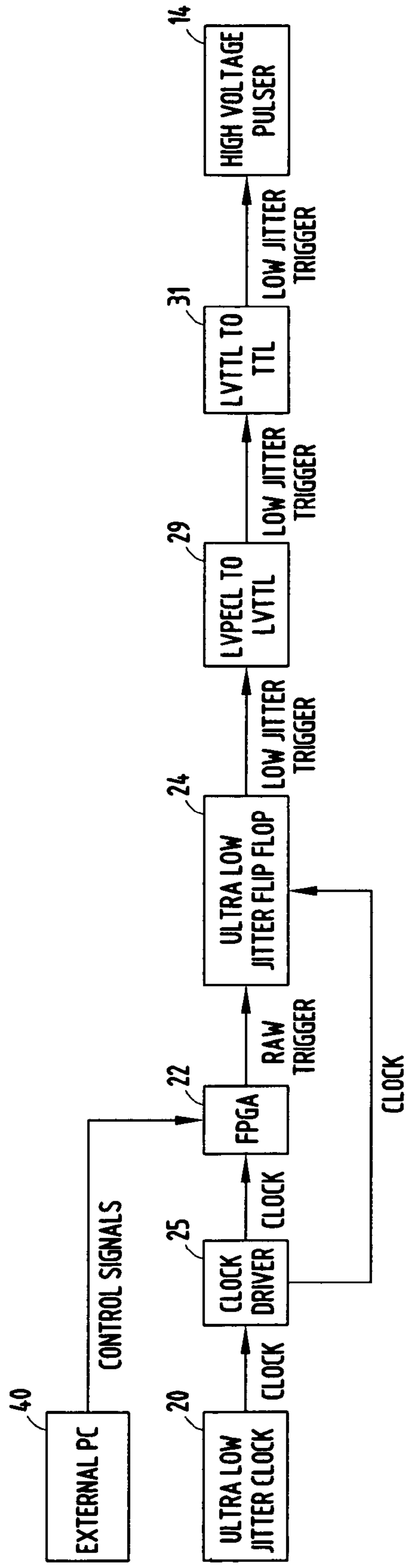
FIG. 3 is an electrical circuit in block form showing additional details of the circuit of the present invention.

In FIG. 3, the external PC 40 is shown coupled to the FPGA pulse generator 22. In the preferred embodiment of the invention, the FPGA employed was a Virtex IV Series, Model No. XC4VLX100-12FF151 3C, available from Xilinx Inc. and which is driven by the ultra low jitter clock 20. Clock 20 is a Model No. SAN K-A2907-500 available from Nel Frequency Controls Inc. and provides clock pulses to a clock driver circuit 25 comprising a Motorola MC100LVEP14, which applies the clock signals to the FPGA 22. The same clock signals are applied to the D input of the ultra low jitter D-type flip-flop 24. In one preferred embodiment of the invention, flip-flop 24 and flip-flops 26 and 28 were Model No. NB4L52 from Semi-Conductor Components Industries.

The ultra low jitter trigger pulses from the Q output of circuit 24, represented by signals 54 in FIG. 2, are applied to a signal level converting circuit 29 for converting the signal to a low voltage TTL signal, with circuit 29 comprising a Model No. MC100EPT21 circuit, whose output signals are coupled to a second level converting circuit 31, which converts the low voltage TTL signals to a higher TTL level signal and comprises a Model No. 74ACT11244 circuit having output signals comprising the input to the high voltage pulser circuit 14. Pulser circuit 14 comprises a Model 666-561 circuit available from Leco Corporation of St. Joseph, Mich.

The FPGA 22 is programmed via an external computer, such as PC 40, to generate a repetitive raw trigger signal 52 (FIG. 2) at a typical frequency of from about 500 Hz to about 100 KHz. The FPGA and the ultra low jitter flip-flop 24 are coupled to receive clock pulses 50 (FIG. 2) from the output of the ultra low jitter system clock 20, as seen in FIG. 1. The signal 52 from FPGA is applied to the input of flip-flop 24 that has excellent jitter characteristics. The shaded areas on the leading and trailing edges of the raw trigger signal 52 represents the typical uncertainty in the pulse trigger initiation and termination and can vary up to 100 ps or more in a conventional pulse trigger circuit. This can lead to the problem discussed above,. namely, the loss of resolution for the TOF mass spectrometer. By controlling the jitter on the high voltage pulse 56 employing the circuit of the present invention, the uncertainty of the arrival time of accelerated ions to the detector 16 at the end of the flight tube 12 is reduced, thus increasing the resolution of the mass spectrometer.

It will become apparent to those skilled in the art that various modifications to the preferred embodiment of the invention as described herein can be made without departing from the spirit or scope of the invention as defined by the appended claims.

The invention claimed is:

1. A time-of-flight mass spectrometer comprising:
- a flight tube including a detector;
- a high voltage pulse supply for applying pulses to said flight tube;
- an ultra low jitter system clock;
- a pulse generating device coupled to said clock to provide a pulse pattern; and
- an ultra low jitter flip-flop coupled to said clock and to said pulse generating device to generate substantially jitter-free trigger signals applied to said high voltage pulse supply for initiating low jitter, high voltage pulses for said flight tube of said time-of-flight mass spectrometer.

2. The time-of-flight mass spectrometer as defined in claim 1 and further including an A/D converter coupled to said detector and to said system clock for providing digital output signals synchronized with said trigger signals.

3. The time-of-flight mass spectrometer as defined in claim 2 wherein said pulse generating device comprises a field programmable gate array (FPGA) and further including a computer coupled to said FPGA for processing data from said A/D converter.

4. The time-of-flight mass spectrometer as defined in claim 3 and further including a switchable preamplifier having one input coupled to said detector and an output coupled to said A/D converter.

5. The time-of-flight mass spectrometer as defined in claim 4 wherein said preamplifier has a second input for receiving a test pulse.

6. The time-of-flight mass spectrometer as defined in claim 5 and further including a second ultra low jitter flip-flop coupled to said FPGA to generate a test pulse applied to said second input of said preamplifier for calibrating said time-of-flight mass spectrometer.

7. The time-of-flight mass spectrometer as defined in claim 6 and further including a third ultra low jitter flip-flop coupled to said FPGA for providing a test trigger to test equipment, such as an oscilloscope.

8. A last stage synchronization circuit for a time-of-flight mass spectrometer comprising:
- an ultra low jitter system clock;
- a pulse generating device coupled to said clock and programmed to provide a pulse pattern, wherein said pulse generating device initiates a pulse with a certainty of less than about six pico second (6 ps); and
- an ultra low jitter flip-flop coupled to said clock and to said pulse generator to generate substantially jitter-free trigger signals for use in generating high voltage pulses for a flight tube of a time-of-flight mass spectrometer.

9. The last stage synchronization circuit as defined in claim 8 wherein said spectrometer includes an ion detector and said circuit further includes an A/D converter coupled to said detector and to said system clock for providing digital output signals synchronized with said trigger signals.

10. The last stage synchronization circuit as defined in claim 9 and further including a switchable preamplifier having one input coupled to said detector and an output coupled to said A/D converter.

11. The last stage synchronization circuit as defined in claim 10 wherein said preamplifier has a second input for receiving a test pulse.

12. The last stage synchronization circuit as defined in claim 11 and further including a second ultra low jitter flip-flop coupled to said pulse generating device to generate a test pulse applied to said second input of said preamplifier for calibrating said time-of-flight mass spectrometer.

13. The last stage synchronization circuit as defined in claim 12 and further including a computer coupled to said pulse generating device for processing data from said A/D converter.

14. The last stage synchronization circuit as defined in claim 13 and further including a third ultra low jitter flip-flop coupled to said pulse generating device for providing a test trigger to test equipment, such as an oscilloscope.

15. A last stage synchronization circuit for a time-of-flight mass spectrometer comprising:

an ultra low jitter system clock for providing clock signals;

a pulse generator coupled to said clock to provide a pulse pattern in response to said clock signals, wherein said pulse generating device initiates a pulse with a certainty of less than about six pico seconds (6 ps); and an ultra low jitter flip-flop coupled to said clock and to said pulse generator to generate substantially jitter-free trigger signals which can be used for generating high voltage pulses for a flight tube of a time-of-flight mass spectrometer.

16. The last stage synchronization circuit as defined in claim 15 wherein said clock comprises a positive emitter coupled logic oscillator and wherein said pulse generator includes an FPGA.

17. The last stage synchronization circuit as defined in claim 16 wherein said spectrometer includes an ion detector and further including an A/D converter coupled to said detector and to said clock for providing digital output signals synchronized with said trigger signals.

18. The last stage synchronization circuit as defined in claim 17 and further including a computer coupled to said FPGA for processing data from said A/D converter.

19. The last stage synchronization circuit as defined in claim 18 and further including a switchable preamplifier having one input coupled to said detector and an output coupled to said A/D converter.

20. The last stage synchronization circuit as defined in claim 19 wherein said preamplifier has a second input for receiving a test pulse.

21. The last stage synchronization circuit as defined in claim 20 and further including a second ultra low jitter flip-flop coupled to said FPGA to generate a test pulse applied to said second input of said preamplifier for calibrating said time-of-flight mass spectrometer.

22. The last stage synchronization circuit as defined in claim 21 and further including a third ultra low jitter flip-flop coupled to said FPGA for providing a test trigger to test equipment, such as an oscilloscope.

23. The time-of-flight mass spectrometer as defined in claim 1, wherein said pulse generating device initiates a pulse with a certainty of less than about six pico seconds (6 ps).

* * * * *